US011061867B2

(12) United States Patent
Natanzon

(10) Patent No.: US 11,061,867 B2
(45) Date of Patent: Jul. 13, 2021

(54) APPLICATION AWARE DEDUPLICATION ALLOWING RANDOM ACCESS TO COMPRESSED FILES

(71) Applicant: EMC IP Holding Company LLC, Hopkinton, MA (US)

(72) Inventor: Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 269 days.

(21) Appl. No.: 16/248,625

(22) Filed: Jan. 15, 2019

(65) Prior Publication Data

US 2020/0226102 A1 Jul. 16, 2020

(51) Int. Cl.
*G06F 16/174* (2019.01)
*G06F 16/13* (2019.01)
*G06F 16/11* (2019.01)

(52) U.S. Cl.
CPC ........ *G06F 16/1748* (2019.01); *G06F 16/113* (2019.01); *G06F 16/116* (2019.01); *G06F 16/13* (2019.01); *G06F 16/1744* (2019.01)

(58) Field of Classification Search
CPC ............ G06F 16/1748; G06F 16/1744; G06F 16/174; G06F 16/113; G06F 16/116; G06F 16/13
USPC ........................................ 707/664, 692, 693
See application file for complete search history.

(56) References Cited

U.S. PATENT DOCUMENTS

| 8,396,839 | B1* | 3/2013 | Huang | G06F 16/1748 |
| | | | | 707/664 |
| 2006/0020645 | A1* | 1/2006 | Hasegawa | G06F 16/10 |
| 2008/0010324 | A1* | 1/2008 | Stebner | G06F 3/0613 |
| 2009/0216907 | A1* | 8/2009 | Eastman | G06F 16/10 |
| | | | | 709/247 |
| 2014/0201316 | A1* | 7/2014 | Chinn | H04L 65/607 |
| | | | | 709/217 |
| 2015/0006475 | A1* | 1/2015 | Guo | G06F 16/1752 |
| | | | | 707/609 |

* cited by examiner

*Primary Examiner* — Hares Jami
(74) *Attorney, Agent, or Firm* — Staniford Tomita LLP

(57) ABSTRACT

A file is received from a client for storage at a deduplication file system. The file is in an archive file format that is used by an application on the client. The file includes subfiles compressed together in the file according to the archive file format, local headers corresponding to the subfiles, and a central directory used by the application to locate information stored in the file. The file is decompressed to store the subfiles separately. A metadata file is created that describes a structure of the file. The metadata file includes the local headers, central directory, pointers to the subfiles, but does not include the subfiles. The file is presented to the client as a single file having the archive file format. A request from the client is received to read the file and the metadata file is read to return data responsive to the request.

15 Claims, 10 Drawing Sheets

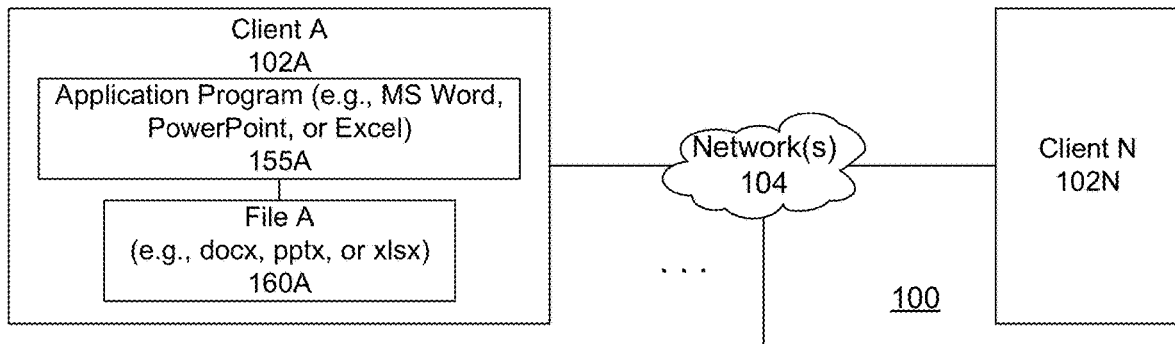
FIG. 1
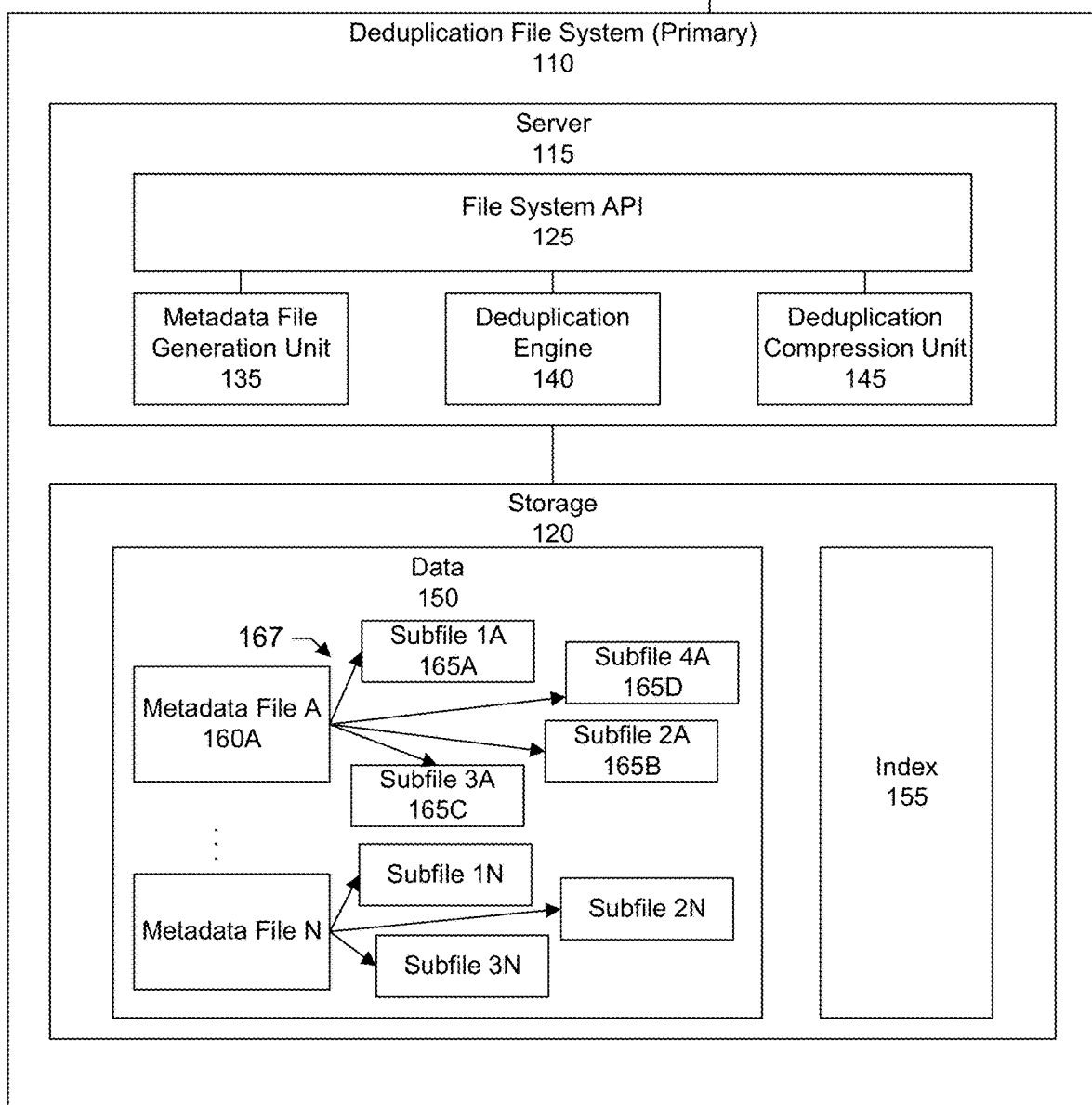

APPLICATION AWARE DEDUPLICATION ALLOWING RANDOM ACCESS TO COMPRESSED FILES

TECHNICAL FIELD

The present invention relates generally to information processing systems, and more particularly to accessing compressed files stored to a deduplication file system.

BACKGROUND

There is a continuing demand for improved techniques to manage the ever-increasing amount of data that is generated each and every day. Techniques such as compression and deduplication can help reduce the amount of data stored in a file system. File compression can combine multiple files into a single compressed file. Deduplication can be used to reduce the amount of redundant data stored. For example, if a unit of data has already been stored, then a reference to the data can be created instead of storing another copy of the data.

Deduplication can be found on many backup systems. It is also desirable to have deduplication on the primary file system to likewise reduce the amount of storage required. A primary file system, however, must also be able to provide good response times and low latency in regards to random access. Random access refers to accessing an item from a given population of elements at random or directly rather than sequentially.

Current deduplication file systems, however, suffer from high latency when responding to random access requests to compressed files.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 1 shows a block diagram of an information processing system for application aware deduplication allowing random access to compressed files, according to one or more embodiments.

DETAILED DESCRIPTION

Figure 2:
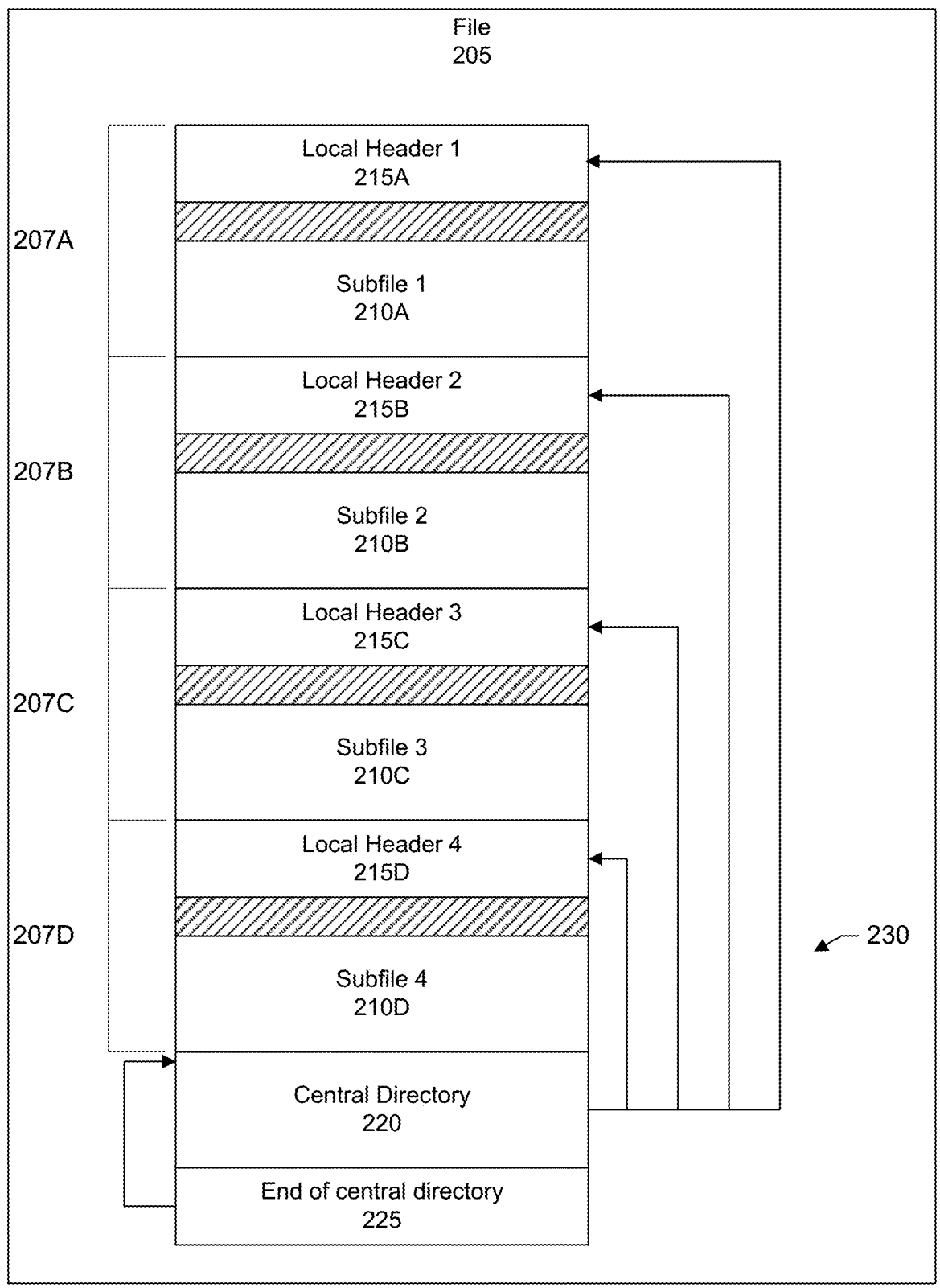
FIG. 2 shows an example of a compressed file whose format includes subfiles and that is associated with an application, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for facilitating random access to a file having a compressed archive file format and stored by an application to a deduplication file system. Deduplication file systems offer storage efficiencies by reducing the amount of redundant data that is stored as compared to traditional file systems. Deduplication may include dividing a file into smaller units of data referred to as chunks or blocks. If a chunk is already stored, a pointer or other reference can be created to the already stored chunk on the deduplication file system and the redundant chunk does not have to be again stored on the file system.

Enterprises and other organizations have looked towards deduplication for their primary file systems or production or primary storage systems in order to help manage the ever-increasing amount of data that continues to be generated each and every day. Primary storage refers to storage that may store the initial copies of data. Such data or content may be frequently and randomly accessed as part of an enterprise's daily operation. In contrast, secondary or backup storage refers to storage that may store secondary copies of the data. Such data or content may be accessed for purposes of recovery. The data in backup storage is generally accessed less frequently and randomly as compared to the primary copies. Thus, in the case of a primary copy of data, there is a greater need to provide fast and efficient random access as compared to a secondary copy of the data.

Some applications store data in compressed archive file formats. For example, a Microsoft Word® document (e.g., .docx) is stored as a compressed document file having multiple files that may be referred to as subfiles. Documents or files in these compressed file formats, among other things, do not deduplicate well because compression causes even minor changes to appear very different as compared to the document file's corresponding uncompressed format. There is a need to provide efficient storage and reduced latency during random access of compressed document files stored to a deduplication file system.

FIG. 1 shows a block diagram of an information processing system 100 configured in accordance with an illustrative embodiment. The information processing system includes client user devices 102A . . . 102N. The user devices communicate over a network 104 with a compute services platform 105.

The user devices can include, for example, desktop, laptop or tablet computers, mobile telephones, smartphones, portable communication devices, or other types of processing devices capable of communicating with compute services platform 105 over network 104. The variable N and other similar index variables herein such as M are assumed to be arbitrary positive integers greater than or equal to two.

The term "user" herein is intended to be broadly construed so as to encompass numerous arrangements of human, hardware, software or firmware entities, as well as combinations of such entities.

Network 104 is assumed to comprise a portion of a global computer network such as the Internet, although other types of networks can be part of network 104, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

In a specific embodiment, compute services platform 105 implements compute services on behalf of respective cloud infrastructure tenants each corresponding to one or more users associated with respective ones of client user devices 102. In a specific embodiment, compute services platform 105 in some embodiments may be implemented as part of cloud infrastructure in the form of a cloud-based system such as an Amazon Web Services (AWS) system. Other examples of cloud-based systems that can be used to provide at least portions of the compute services platform 105 and possibly other portions of system 100 include Google Cloud Platform (GCP) and Microsoft Azure.

In a specific embodiment, compute services platform includes a deduplication file system 110 including a server 115 and storage 120. The server may include hardware components such as a processor, memory, network interface card, and so forth. Examples of storage include disk arrays such as an array of solid state drives (SSDs—e.g., flash storage), traditional hard drives (HDDs), and so forth.

Components of the deduplication file system may include an application programming interface (API) 125, a metadata file generation unit 135, a deduplication engine 140, and a file compression unit 145. In an embodiment, the file compression unit is native to the deduplication file system. It should be appreciated that the blocks, modules, and components shown in FIG. 1 may be functional and there can be many different hardware and software configurations to implement the functions described.

A file system provides a way to organize, manage, locate, and retrieve data 150 stored in storage. Each client may include any number of application programs 155A such as word processing programs (e.g. Microsoft Word®), spreadsheet programs (e.g. Microsoft Excel®), presentation programs (e.g., Microsoft PowerPoint®), and so forth. Users at the clients can use the application programs to create documents or files 160A. These documents and files may be transmitted over the network and saved to and retrieved from the deduplication file system.

In particular, the file system API provides an interface through which the client application programs can communicate with the deduplication file system. For example, a client application can use the file system API to send input/output (IO) commands to the deduplication file system such as write commands, read commands, open commands, close commands, list commands, and so forth.

In a specific embodiment, the deduplication file system serves as a primary file system. With the rise of flash storage arrays more and more primary file systems support deduplication. In another specific embodiment, there can be a backup system, separate from the primary file system, to provide a backup of data stored on the primary file system. The backup system may be remote from the primary file system.

Deduplication file systems may leverage multiple techniques in order to achieve high deduplication ratios. In a specific embodiment, each file is deduplicated by cutting the file at a specific location based on the content of the file—the chunk sizes may (or may not) be different, but the size of the each chunk may be relatively large due to the amount of metadata needed to store the chunks. For example, the size of a chunk may range from about 20 to 30 kilobytes (KBs). A modern deduplication storage array may support global compression thereby achieving better compression for similar files.

Since many applications use compressed file formats, small changes to a file such as a word processing document can result in a significantly different compressed file. For purposes of backup and recovery it can be desirable to maintain the file in a non-compressed form and recompress the file when user wants to recover it. While this can be suitable for backup and recovery, for primary storage the overhead of recompressing the data is generally too high.

A ZIP file is an example of a compressed archive file format. A ZIP file is a type of file formatted according to the ZIP file format as provided by PKWare, Inc. of Milwaukee, Wis. A detailed discussion of the ZIP specification is provided in "APPNOTE.TXT—.ZIP File Format Specification" Version: 6.3.5, Nov. 20, 2018, by PKWare and is incorporated by reference along with all other references cited.

ZIP is an archive file format that supports lossless data compression. Lossless compression is a class of data compression algorithms that allows the original data to be perfectly reconstructed from the compressed data. By contrast, lossy compression permits reconstruction only of an approximation of the original data, though usually with improved compression rates (and therefore reduced file sizes). Lossless compression is used in cases where it is important that the original and the decompressed data be identical, or where deviations from the original data would be undesirable. Examples where lossless compression may be used include executable programs, text documents, and source code. A ZIP file is a data container that may store a set of files in compressed form. A ZIP file or ZIP container may contain any number of entries including one or more files or directories that may have been compressed into a single ZIP file. The ZIP file format permits a number of compression algorithms, such as DEFLATE.

The ZIP file format is used by many applications including, for example, Microsoft Office by Microsoft Corporation of Redmond, Wash. Starting with Microsoft Office 2007, when a user creates a Microsoft Office document using an application such as Microsoft Word® (documents having the file extension ".docx"), Microsoft Excel® (documents having the file extension ".xlsx"), or Microsoft PowerPoint® (documents having the file extension ".pptx"), the document content is stored in an application-specific file format. In particular, the documents are stored according to the Office Open XML format. Open XML is an extension of the ZIP format and is a zipped, XML-based file format developed by Microsoft for representing spreadsheets, charts, presentations and word processing documents.

FIG. 2 shows a block diagram of a document or file 205 that may be created by a client application program (e.g., Microsoft Word®) to be saved at the deduplication file system. The file is in a compressed archive format such as a ZIP file format. The ZIP file includes a set of entries, such as entries 207A-D. There can be any number of entries. Each entry includes a local header followed by a subfile. The subfile may be referred to as file content or payload data that has been compressed so as to reduce the size of the ZIP file.

More specifically, in the example shown in FIG. 2, the ZIP file includes a set of subfiles 210A-D that have been compressed together into a single file. The structure of the ZIP file includes a set of local headers 215A-D corresponding to the set of subfiles, a central directory 220, and a marker or tag indicating an end of the central directory 225. That is, FIG. 2 shows an example of the compressed archive format (e.g., ZIP file format) which includes built-in headers followed by compressed file content, and then again a header of the next subfile. At the end of the ZIP file is a central directory that can be used to locate various entries in the ZIP file including the subfiles in the ZIP file and thus allow access 230 to each subfile in a random way.

Specifically, the structure of the ZIP file starts with first local header 215A, followed by first corresponding subfile 210A, followed by second local header 215B, followed by second corresponding subfile 210B, followed by third local header 215C, followed by third corresponding subfile 210C, followed by fourth local header 215D, followed by fourth corresponding subfile 210D, and so forth. Following the last subfile is the central directory. The blocks shown with a diagonal fill pattern indicate extra data that may be found within a local header.

The central directory at the end of the ZIP file identifies the entries in the ZIP file and the locations of the entries in the ZIP file. The central directory allows for identifying the local headers, corresponding subfiles, and their locations within the ZIP file. For example, the central directory may include a listing of entry names or other local header names, and offsets pointing to the entries or local headers within the ZIP file. A local header may include information describing the corresponding subfile. The information of the local header may be organized into a set of fields. Fields may include, for example, subfile signature, subfile name, last modified time and date stamps, compression type, compressed size, uncompressed size, and so forth. The local header may include offsets to the fields and their lengths so that the fields can be properly located.

In other words, some applications compress multiple files into a single file. A good example is the current version of Microsoft Office. Microsoft Office files are kept in the Open XML format which is a ZIP file containing multiple files. Different versions of the same documents may have many common files inside the ZIP file. All images may be compressed the same way.

Figure 3:
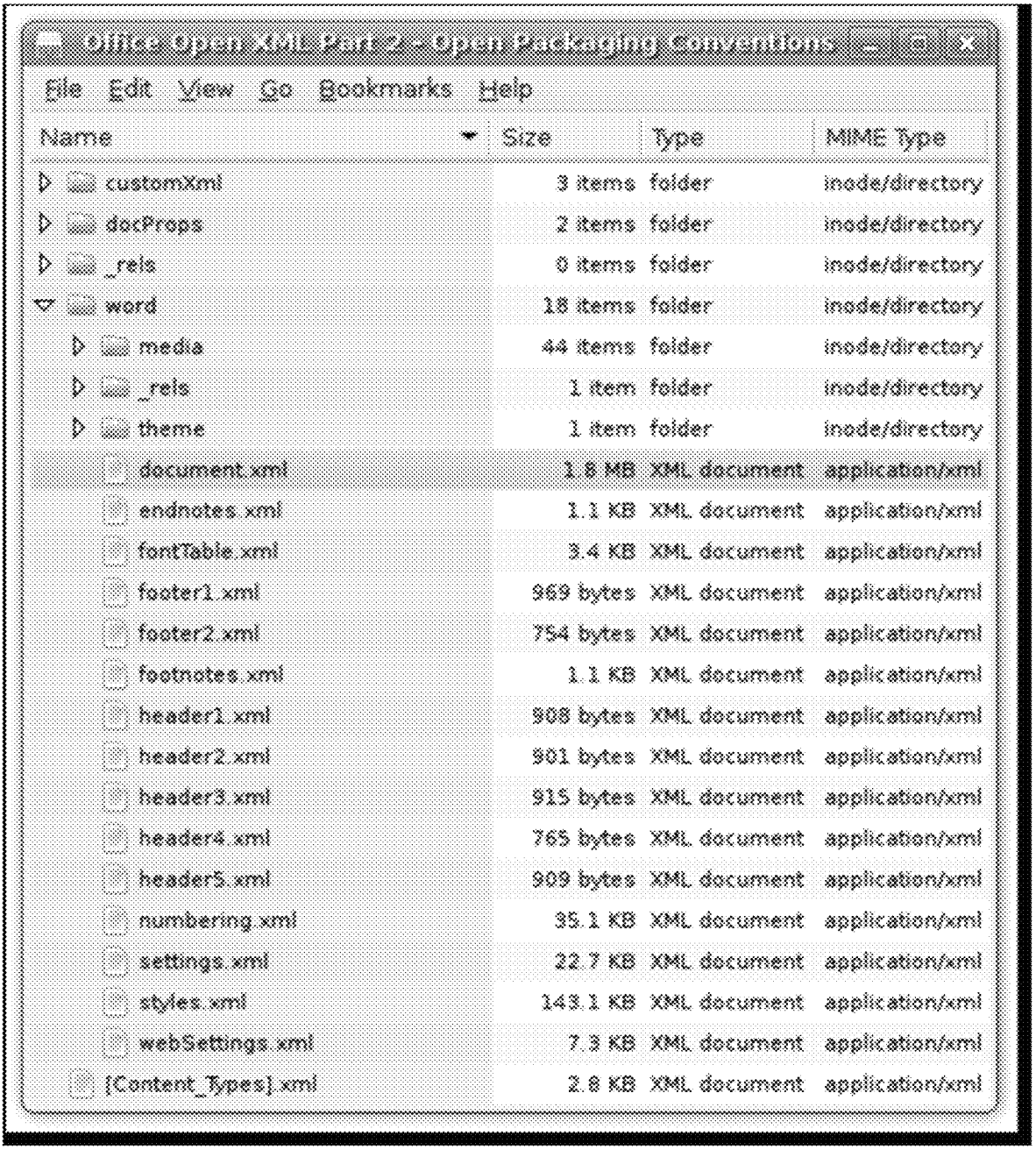
FIG. 3 shows a screen shot of files in a docx file, according to one or more embodiments.

FIG. 3 shows a screen shot of an example of a Microsoft Word (docx) document file in an expanded state. As discussed, the file format is Open XML and includes any number of subfiles and folders. From the user's perspective, however, the document appears as a single file (e.g., single docx file). An application, such as Microsoft Word (or other Microsoft Office application) stores the document as a compressed archive of multiple eXtensible Markup Language (XML) files. Content is stored in separate files and compressed into a single ZIP-compressed file. More specifically, rather than storing document data in a single binary file as in pre-2007 Microsoft Office, later Microsoft Office applications such as Microsoft Word® docx files, for example, are created using the Open XML format, which stores documents as a collection of separate files and folders in a compressed ZIP package.

As shown in the example of FIG. 3, within a docx file are XML files and folders including docProps, Word, and rels, which hold the document properties, content, and relationships between the files. Document text is saved using plain text files and document images are stored as individual image files within the docx file. These files may also include page formatting information, authorship data, and document review notes. A user may define their own XML schema within the document. In other words, there can be an XML file that contains the document data itself (e.g., user-inputted content or text) and other XML files that describe the data. Such descriptions may include information on formatting, presentation, styles, font, size, color, and other attributes. Further contained within the document file is directory information that the application (e.g., Microsoft Word) may use to locate the document contents and other information (e.g., images embedded in the document, media inside the document, and so forth).

In other words, Office Open XML documents are stored in Open Packaging Convention (OPC) packages, which are ZIP files containing XML and other data files, along with a specification of the relationships between them. Depending on the type of the document, the packages have different internal directory structures and names. An application will use the relationships files to locate individual sections (subfiles), with each having accompanying metadata, in particular Multipurpose Internet Mail Extensions (MIME) metadata.

A basic package includes an XML file called [Content Types].xml at the root, along with three directories: rels, docProps, and a directory specific for the document type (for example, in a .docx word processing package, there would be a word directory). The word directory contains the document.xml file which is the core content of the document.

The XML file "[Content Types].xml" provides MIME type information for parts of the package, using defaults for certain file extensions and overrides for parts specified by Internationalized Resource Identifier (IRI). The directory "_rels" includes relationships for the subfiles within the package. The file "rels/.rels" is where the package relationships are located. Applications look here first. The file "docProps/core.xml" includes the core properties for any Office Open XML document. The file "word/document.xml," for example, is the main part for the Microsoft Word document that includes the user-inputted text content.

In a specific embodiment, a deduplication file system may deduplicate each file separately by chunking the file and looking for identical chunks in the system (chunks coming from all files in the system). One problem with current deduplication techniques is that the chunking algorithm will not cut the file in the locations where the (sub)files start and thus the end and beginning chunk for each such image for example may not be deduplicated. This causes much higher deduplication ratios compared to what may be desired.

Moreover, the xml files may contain multiple text files. In many cases, if there is only a minor change to the document only a few bytes will change in the xml files, but when compressed there will be no or little deduplication because the compressed version appears very different from the uncompressed version. Further, there can be many different compression algorithms. Each compression algorithm may also have many variants and compression levels which also result in very different outputs as compared to the decompressed formats or states.

Below is a brief summary of some challenges with current deduplication file systems.

1) Files in compressed formats such as used by Microsoft Office (e.g., Microsoft Word) are not chunked at good or optimal places. For example a text before an image may cause the beginning of the image to not deduplicate. Further, there is generally no reason to chunk large images as images generally do not have common parts. Thus, attempting to chunk large images can be an inefficient use of compute resources.

2) Compressed file formats do not deduplicate well. An almost identical text file may be very different after compression.

3) Almost identical small files do not deduplicate well. For example, documents having the docx format may contain many small files which change little. Deduplication will not catch the similarities but compression of a new file compared to its previous version will achieve much higher compression ratios.

4) A primary storage system is expected to support low latency. If a file format is changed on read, the latency will not be acceptable to a primary storage system. As discussed, this is generally not an issue when describing a secondary storage.

5) Primary storage arrays require random access to files. If a file is not kept in a native format, a reassembly may require too many resources and create a non-acceptable level of performance.

6) Compressed files do not work well with global compression. Similar files before compression appear very different after compression.

Referring back now to FIG. 1, in a specific embodiment, systems and techniques are provided for changing the file format of compressed files, allowing both high deduplication ratios and random access to compressed files with very low latency. As discussed, file formats such as docx, xlsx, and pptx, use ZIP compression. Each document is a set of files which may include user-inputted data itself and media files and XML, files describing the document.

In a specific embodiment, the document file is maintained on the deduplication file system in a decompressed format or state, i.e. as a set of files including media and xml files. In this specific embodiment, deduplication is performed at the internal level of the file or at the subfile-level.

In a specific embodiment, the document file is not rebuilt on a read. Rebuilding the document file on a read may offer acceptable performance for relatively small files. For large files where random access is required, however, the latency involved with the rebuild may not be acceptable.

Rather, in a specific embodiment, for each document file (e.g., each ZIP file), there is a corresponding metadata file that is maintained on the deduplication file system that describes the structure of the ZIP file. The metadata file includes all the zip structure except the data of the compressed files within the ZIP file. The compressed file will be kept separately, and thus the metadata file will be very small because it does not include the data. Each compressed file can be kept in the native ZIP format on the deduplicated storage or uncompressed. In a specific embodiment, the file is kept uncompressed in regards to the compression algorithm used by the client application, and instead a built-in native compression engine of the deduplicated storage may be used.

The user reading the deduplication file system will not be able to see the files within the document file, i.e. the subfiles within a docx ZIP. Rather, the user will see, for example, a docx file. The docx file is described by the metadata file. When the user attempts a random access, such as a read random access into the docx file, the deduplication file system calculates the content based on the metadata file and will read the data from the relevant files within the deduplicated system. In other words, the metadata file can provide a map to locate the various subfiles or XML files that were originally included in the document file (e.g., docx ZIP file).

If the separate files within the docx are kept in the original ZIP format the system can identify which portion of the file to read based on offset translation. If the system keeps the internal document file uncompressed, the metadata file can describe a ZIP file where the compression method is not to compress (store). In this case the file kept in the storage will not be binary identical to the original file stored, but the ZIP content will be identical. So, overall the docx file will be binary identical. Keeping or maintaining the file in a non-compressed format allows for leveraging deduplicated storage system features such as global compression to achieve even higher deduplication ratios. In a specific embodiment, the same structure of the ZIP-compressed document file is maintained but the file content is removed and random access to the ZIP file is allowed by translation of offsets to the data as if the files were included in the metadata file.

Referring now to FIG. 1, the metadata file generation unit is responsible for generating a metadata file corresponding to a document file or ZIP file saved to the deduplication file system. In a specific embodiment, the ZIP file includes a set of entries, each entry including a local header and a corresponding subfile, and a central directory indicating locations of entries or local headers within the ZIP file. In a specific embodiment, the ZIP file is in the Office Open XML format. In a specific embodiment, the metadata file corresponding to the ZIP file includes the set of local headers and central directory found in the ZIP file, but does not include the subfiles. In other words, the file content or payload data from the ZIP file may be omitted from the metadata file.

The deduplication engine is responsible for deduplicating the ZIP file. In an embodiment, the deduplication engine unzips and decompresses the ZIP file in order to operate on the subfiles. Deduplication operations may include chunking each subfile and determining whether or not a chunk already exists in the deduplication file system. If the chunk already exists, a pointer may be created to point to the already existing chunk and the redundant chunk does not have to be again stored. If the chunk does not exist, the chunk may be stored on the deduplication file system.

The compression unit is responsible for applying a compression algorithm to the ZIP file, individual subfiles, or chunks. In a specific embodiment, the compression algorithm is native to the deduplication file system and separate from a compression algorithm that may be used by the client application program. The deduplication file system native compression algorithm can allow for global compression across the entire deduplication file system.

The storage of the deduplication file system includes data 150 and an index 155. The data represents the files stored by the deduplication file system. The data may be deduplicated. The data may be compressed or uncompressed. The index is maintained by the deduplication file system and allows, among other things, locating deduplicated chunks associated with the ZIP file, subfiles, or both.

In particular, the data stored in storage includes a metadata file 160A corresponding to a ZIP file and subfiles 165A-D that may be found in the ZIP file. As shown in the example of FIG. 1, these subfiles are stored separate from the metadata file. The metadata file may include references or pointers 167 that can be used to locate the associated subfiles.

Figure 4:
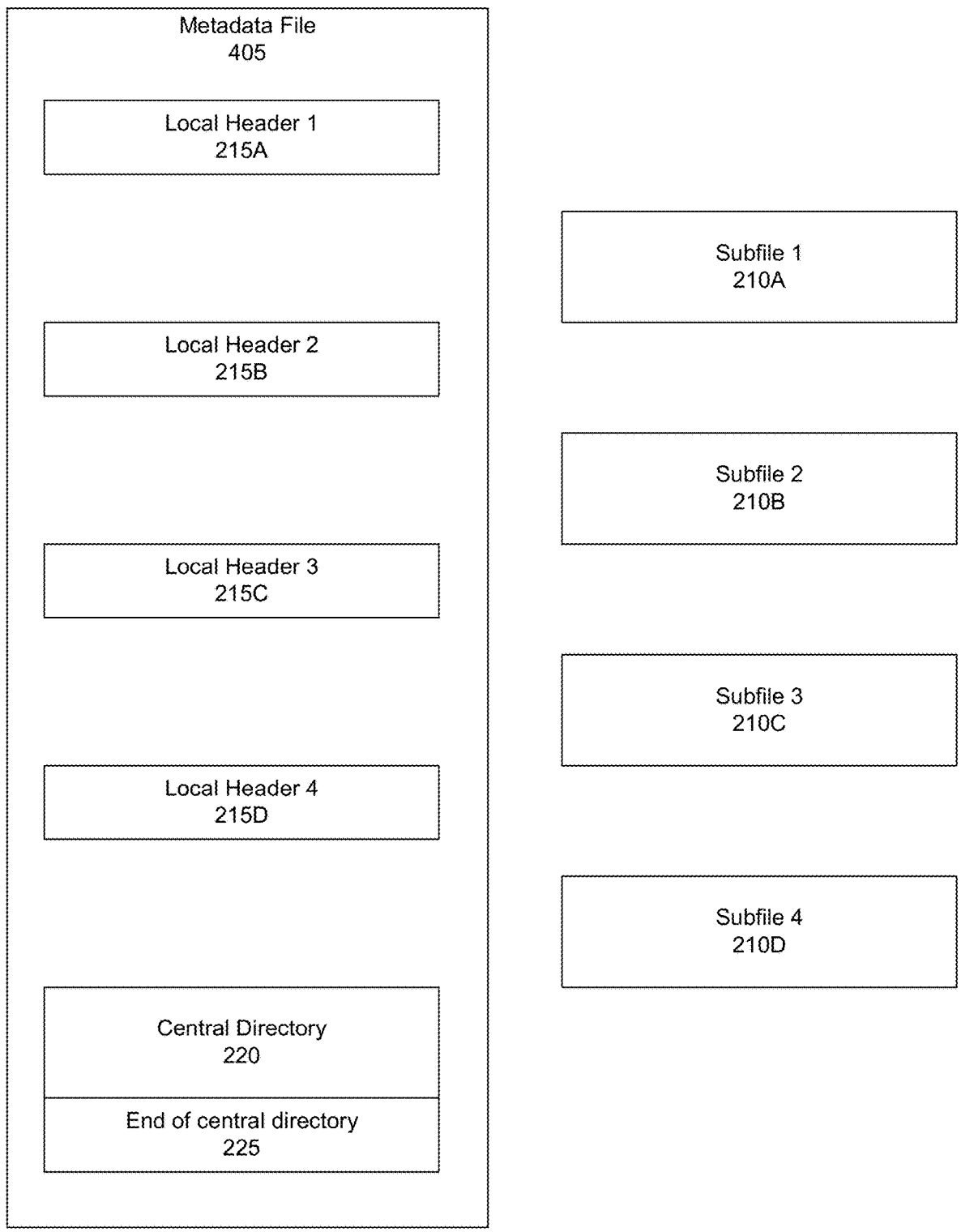
FIG. 4 shows an example of a metadata file and separate subfiles, according to one or more embodiments.

FIG. 4 shows a further example a new format for storing data on the deduplication file system. Specifically, FIG. 4 shows a metadata file 405 corresponding to a ZIP file where local headers 215A-D and central directory 220 are written to the metadata file. Subfiles 210A-D that were contained in the file, however, have been extracted and stored separately from the metadata file. That is, subfiles 210A-D and metadata file 405 exist as separate files on the deduplicated storage. In a specific embodiment, the user will only see a single ZIP file, and the internal offsets in the ZIP file will translate to either reading from the metadata file or from the separate file, allowing random access and good deduplication. In a specific embodiment, the zip format may change to a format where the compression method allows the deduplicated storage to achieve both deduplication and global compression.

Figure 5:
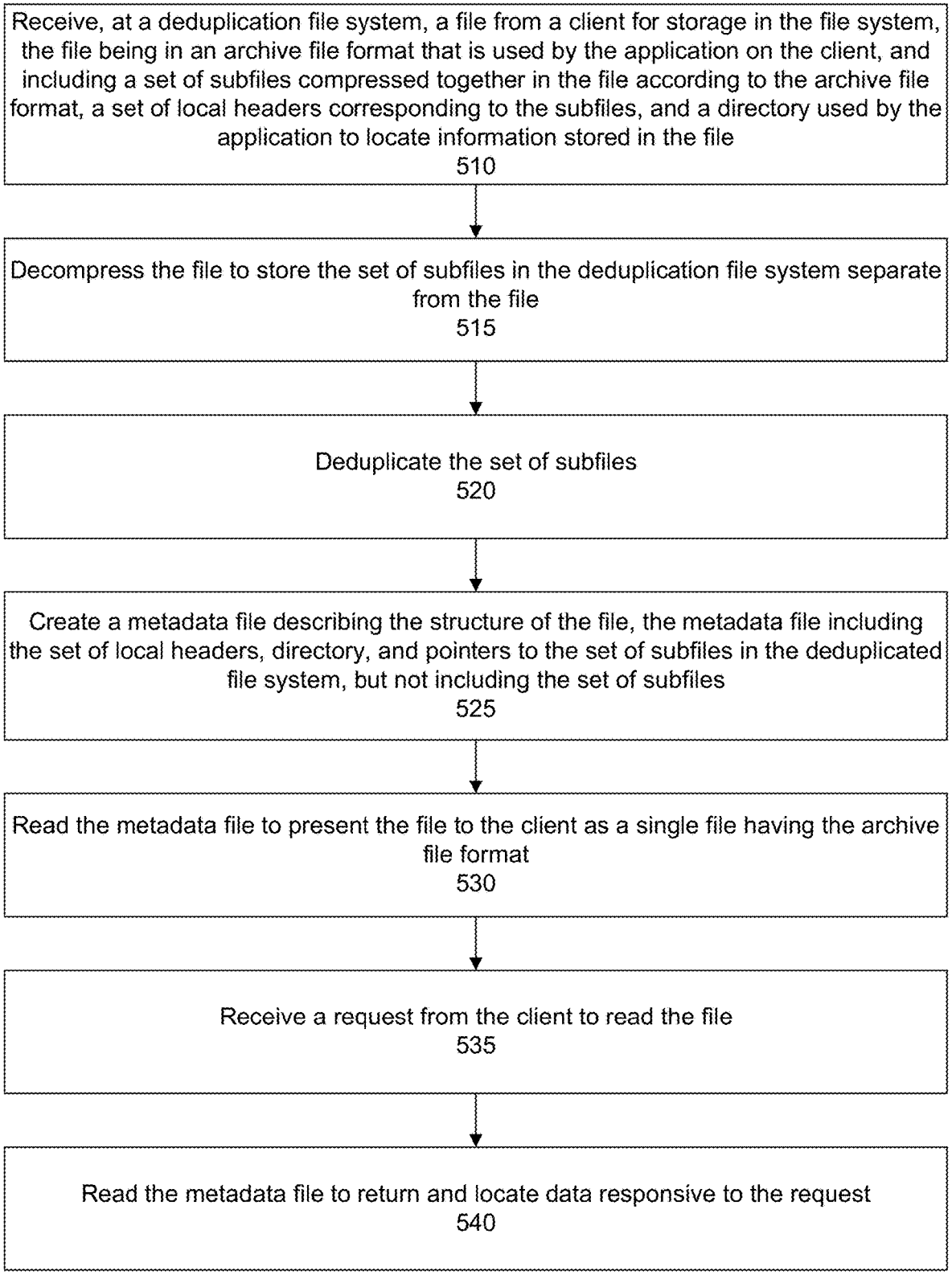
FIG. 5 shows an overall flow for application aware deduplication allowing random access to compressed files, according to one or more embodiments.

FIG. 5 shows an overall flow for application aware deduplication allowing random access to compressed files. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 510, a file is received at a deduplication file system from a client for storage in the deduplication file system. The file is in an archive file format that is used by an application on the client, and includes a set of subfiles compressed together in the file according to the archive file format, a set of local headers corresponding to the subfiles, and a central directory used by the application to locate information stored in the file.

In a step 515, the file is decompressed to store the set of subfiles in the deduplication file system separate from each other.

In a step 520, the file, or more particularly, the set of subfiles are deduplicated.

In a step 525, a metadata file is created that describes the structure of the file. The metadata file includes the set of local headers, the central directory, and a set of pointers to the set of subfiles in the deduplication file system—but not including the set of subfiles themselves. In other words, the set of subfiles are omitted or are not present in the metadata file.

For example, in a specific embodiment, upon a file being transmitted from the client to the deduplication file system for storage, the file may be identified as being a ZIP file or having a compressed archive file format. The metadata file generation unit may parse the identified ZIP file and read the central directory located in the ZIP file. The reading of the central directory allows the metadata file generation unit to identify and locate the entries in the ZIP file including each local header and each corresponding subfile. The local headers along with the central directory may be read and copied into the metadata file. The subfiles may be extracted, deduplicated, and stored separately in the deduplication file system.

More particularly, a method may include receiving a first file having a compressed archive file format and including a first set of entries, and a first central directory indicating a location of each entry of the first set of entries in the first file, where each entry of the first set of entries includes a local header and a subfile; reading the first central directory to locate a first entry in the first file; writing a first local header from the first entry into a first metadata file; not writing a first subfile from the first entry into the first metadata file; storing the first subfile separate from the first metadata file; creating a first reference in the first metadata file that indicates a location of the first subfile; receiving a second file having the compressed archive file format and including a second set of entries, and a second central directory indicating a location of each entry of the second set of entries in the second file, where each entry of the second set of entries includes a local header and a subfile; reading the second central directory to locate a second entry in the second file; writing a second local header from the second entry into a second metadata file, different from the first metadata file; not writing a second subfile from the second entry into the second metadata file; storing the second subfile separate from the second metadata file; and creating a second reference in the second metadata file that indicates a location of the second subfile.

The first and second metadata files are different or separate from each other. Depending on their respective corresponding first and second archive files (e.g., ZIP files), the first and second metadata files may, for example, have a different number of local headers, point to different subfiles, point to different numbers of subfiles, have different central directories, have different local headers, and so forth.

In a step 530, the file (e.g., ZIP file) transmitted to the deduplication file system for storage is presented to the client as a single file having the archive file format. Thus, although the file may have been decompressed from its original archive file format and the decompressed subfiles chunked and deduplicated, the file is presented to the client as a single file in its original archive file format (e.g., docx, pptx, or xlsx). In other words, during presentation of the file to the client, the file may be a virtual file that does not actually exist. The file is presented as appearing in its original archive file format (e.g., as a single docx file, as a single pptx file, or as a single xlsx file) as provided to the deduplication file system—despite the file having been or remaining decompressed with respect to the archive file format and the set of subfiles being stored separately from each other on the deduplication file system.

The metadata file facilitates the presentation as the metadata file includes information corresponding to the file and, more particularly, information describing the subfiles contained in the file. For example, in a specific embodiment, when the deduplication file system is mounted, information from the various metadata files corresponding to the various document or ZIP files that have been stored to the deduplication file system can be read in order to present those document files to the user as they were originally stored or provided to the deduplication file system. The deduplication file system maintains multiple individual files internally for the docx file (or other ZIP file), but these individual files are not exposed externally to the client or user. Rather, the client or user will see the original docx file (or other ZIP file). This helps to improve the user experience and facilitates use of the deduplication file system with the client applications. The enterprise will not have to rewrite the client applications in order to enjoy the benefits of the deduplication file system.

In a step 535, a request is received at the deduplication file system from the client to read the file (e.g., read the docx file, read the xlsx file, or read the pptx file). In a step 540, the corresponding metadata file is read to return and locate data responsive to the request. As discussed, the metadata file includes metadata about the subfiles from the file and the location where the subfiles actually exist. Depending upon request, information may be read and returned from the metadata file, one or more subfiles, or both.

More particularly, upon receiving a request to read the file, the central directory in the corresponding metadata file is read to determine a location of data responsive to the read request. The central directory may reference a particular local header in the metadata file. The particular local header may then be read. From the reading of the particular local header, a determination may be made that the location of the data is in a particular subfile, the particular subfile being stored separate from the metadata file on the deduplication file system, and the particular subfile having been present or included in the file originally received from the client. The information in the metadata file is used to locate the particular subfile and the particular subfile is read to return the data responsive to the read request. The pointer in the metadata file to the particular subfile may be located anywhere in the metadata file such as in the local header, appended to the local header, or in the central directory.

Figure 6:
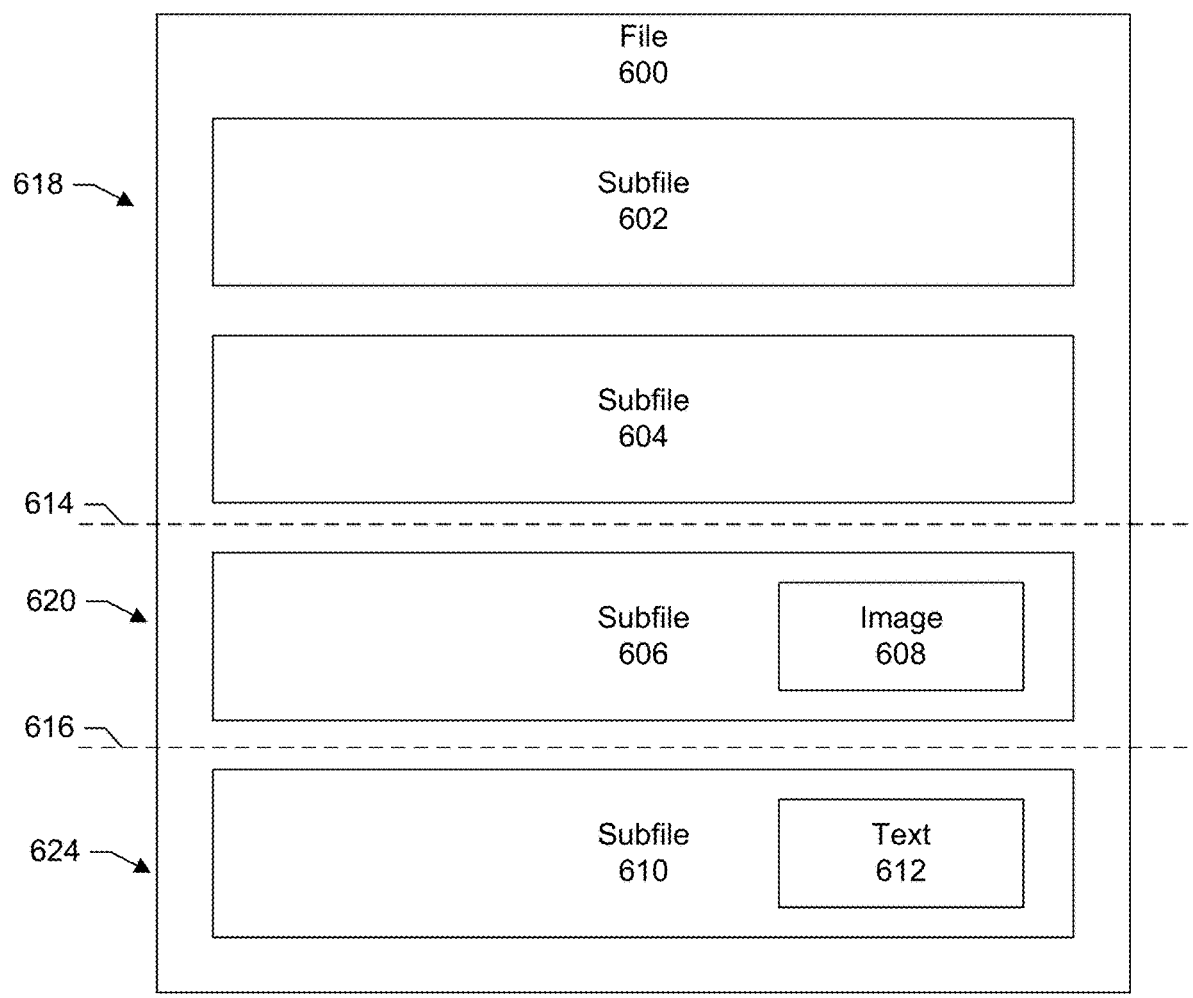
FIG. 6 shows another example of a compressed file, according to one or more embodiments.

FIG. 6 shows an example a chunking operation that may be performed during deduplication. As discussed, a file (or an object or other data) may be deduplicated by cutting the file at specific locations. Dividing or cutting a file or object into portions or pieces is an example of chunking a file. The chunk sizes may be different or may be the same and may depend on how the file is chunked. In one example and without limitation, the size of the chunks may be on the order of 20 KB to 30 KB. The size of the chunks may be balanced with the amount of metadata associated with deduplicated chunks. Chunk sizes that are too small may be associated with too much metadata. Chunk sizes that are too large do not deduplicate well. Further, the chunk size can be tuned and may depend on the file being chunked.

A document format may include multiple files. In particular, the document format may be embodied as a ZIP file that stores smaller XML (eXtensible Markup Language) files. For convenience and clarity, some embodiments, including file formats, are discussed using the term file to refer to the file as a whole (e.g., the ZIP file). The files contained within the file (e.g., the XML files) may be referred to herein as subfiles. Thus, the document format essentially includes a container or package (the file such as a ZIP file) that contains smaller subfiles. The format of the file may be specific to the application. For example, a document format may differ from a presentation format or a spreadsheet format. Embodiments may also apply to other applications and their associated file types. When deduplicating these types of files, the format of the file is taken into account by the file system or by the data protection system.

Embodiments may also account for the manner in which the file is compressed. For example, the file may be compressed (and/or encrypted) as a whole. Alternatively, each of the subfiles may be compressed separately. In one example, the whole file is then compressed—achieving dual level compression. Further, the deduplication amount or the deduplication ratio of uncompressed files compared to the deduplication ratio of compressed separate files may be different.

A small change in a non-compressed file results in a completely different compressed file and this factor may impact deduplication ratios.

More generally, a deduplication system typically deduplicates each file separately or independently by chunking the file and looking for identical chunks in the system (e.g., looking at chunks coming from all applications or data sources in the system). Embodiments further chunk the file in a manner that accounts for the format. By accounting for the file format, deduplication ratios can be improved.

For example, chunking a file in a manner that accounts for the format and/or the content may allow an image contained in the file to be chunked consistently. If the file were chunked without regard to the format, the chunk including the image may also include other content such as text. As a result, the image may not deduplicate well even if that same image is included in other files. When the format is taken into account, the image can be chunked by itself. This allows the image to be deduplicated more effectively and results in improved deduplication ratios.

In some examples, deduplication is performed on uncompressed files. More specifically, because small changes to a file can result in a compressed file that is very different from the uncompressed file, decompressing the file prior to deduplication allows those portions of the file that are common to other files to be deduplicated more effectively. By deduplicating with respect to the uncompressed files, higher deduplication ratios may be achieved.

In one example, the storage operation (or a data protection operation) may start a deduplication operation by cutting or chunking a file. The file may be cut at locations that correspond the locations where the subfiles end/begin. It may not be necessary to separate all of the subfiles into chunks. Rather, some of the chunks may include multiple subfiles. For example, media files included in a particular format may be cut or chunked separately as they typically remain unchanged. Images can also be deduplicated effectively when compressed because the same compression is typically applied.

As discussed, during operation of the deduplication file system, a file may be presented to a user or on a client as a single file (e.g., a docx file). Internally, however, the deduplication file system may operate or perform deduplication on a decompressed file and may work on each subfile separately. This allows higher deduplication ratios to be achieved. Further, the various subfiles may be stored separately in the deduplicated storage. The subfiles may be stored in a compressed form or an uncompressed form. When there is a request to read the file, the read may be performed using the corresponding metadata file. This facilitates random access and reduces latency as the subfiles do not have to be rebuilt into the file.

In addition, it may be possible to leverage differential compression. For files that are similar (e.g., have the same name and/or similar content), the deduplication file system can use differential compression for files for which the deduplication was low, but there are subfiles in the previous version of the document with similar properties.

Embodiments provide a system where files are presented to a client as whole files even though, in the file system storage, the files are stored as chunks. The chunks may be stored in a compressed form or an uncompressed form. In addition to deduplication, embodiments may also employ differential compression. In this example, the files may be stored in a compressed state in order to take advantage of the differential compression.

In the example shown in FIG. 6, a file is chunked into portions based, in part, on where the corresponding subfiles start/end. By treating these subfiles independently or as small groups, the deduplication and/or compression of the file can be improved. For example, in a given document, the text may change from one version to the next. However, portions of the file may not change. A particular subfile (or other subfile) may not change. By chunking the file based on locations of the subfiles, the file can be deduplicated more efficiently. Further, similar files may be compressed with higher compression ratios. Both deduplication and differential compression can conserve storage space.

Specifically, FIG. 6 illustrates a file 600 that includes subfiles 602, 604, 606 and 610. The subfile 606 may contain an image 608 and the subfile 610 may include text 612. The subfiles 602 and 604 may contain other information related to the file 600 such as a header, styles, properties, etc.

FIG. 6 illustrates that the file 600 is chunked, by way of example only, into three chunks. The file 600 is cut at position 614 and position 616. The position 614 is between the end of subfile 604 and the beginning of subfile 606. The position 616 is between the end of subfile 606 and the beginning of subfile 610. In addition to cutting or chunking the file based on the beginning/end of the subfiles, the size of the chunk may be considered. Thus, a particular chunk may, but is not required to, include more than one subfile. If this is the case, the subfiles that may not be subject to change may be selected. In addition, the selected files may not be directly next to each other within the file 600.

Thus, a first chunk 618 includes the subfiles 602 and 604. A second chunk 620 includes the subfile 606 and a third chunk 624 includes the subfile 610. By chunking the file in this manner, the image 608 can be chunked by itself. This ensures that the image 608 is deduplicated—even when compressed. If, for example, the chunking resulted in a chunk that included the image 608 and some text, any change to the text would reduce the deduplication efficiency. The text 612 may also be part of the subfile 610. In one example, the text 612 may change a lot or a little with regard to the text of other files. However, deduplication can be effective at least because the other subfiles may not change and may be deduplicated.

Referring back now to FIG. 1, as discussed, when the client saves the file, the deduplication engine may deduplicate the file when storing the file in the data of the storage. When an application running on the client (and/or on the server) presents the file, the file may be presented as a single file. In one example, the file is a single file at least from the perspective of the client and/or the corresponding application, which understands the format. When storing the file, the deduplication engine may determine the format of the file. The deduplication engine may then unzip the file and decompress the file such that the subfiles can be identified and such that the deduplication engine can work with uncompressed subfiles. The file, in a decompressed state, may then be chunked as previously discussed. In some examples, the file can be chunked when in a compressed state because the format of the file is known. For example, each subfile may be compressed independently. This allows the file to be chunked when compressed.

After the file is chunked and decompressed, the deduplication engine can then work on each chunk or each subfile in order to deduplicate the file or deduplicate the subfiles with respect to the data. In one example, the deduplication engine may operate on each subfile as a separate entity.

In an embodiment, deduplication is performed in a manner that presents the file as a whole to the client (or user)

while maintaining the file in chunks in the storage. The chunks may be compressed or uncompressed in the storage. The file is deduplicated from the perspective of the subfiles. The deduplication file system may maintain an index. The index can be used to identify the subfiles corresponding to the file. Thus, if the client requests the file, the index may be used to locate all of the file's subfiles. This allows the file to be reconstituted and returned to the client. If necessary, the subfiles are placed into the format associated with the application requesting the file. Thus, the subfiles may be zipped or otherwise processed according to the relevant format.

Figure 7:
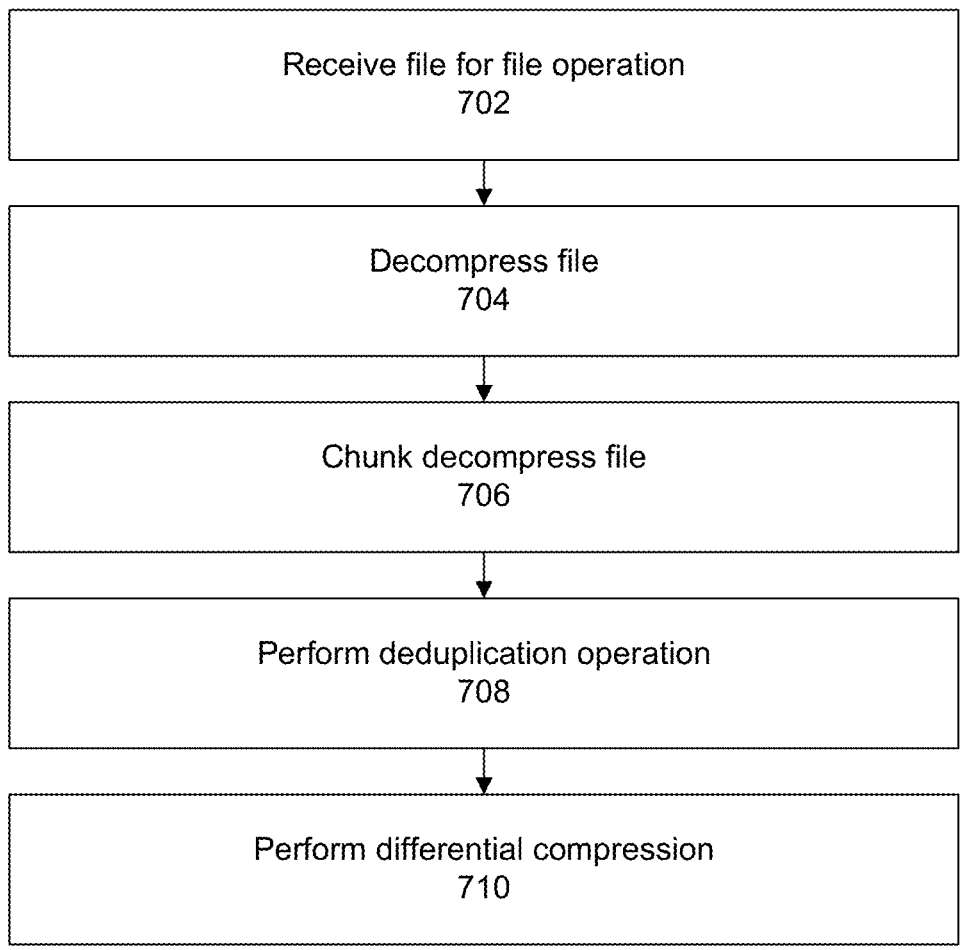
FIG. 7 shows a flow for application aware deduplication, according to one or more embodiments.

FIG. 7 illustrates an example of a method for performing a storage system operation or a file system operation or a data protection operation. In FIG. 7, a file may be received 702 at a file system (or at a backup server or a file system server). The file received by the file system may be associated with an application and may have a particular format. The file system can ascertain the format of the file in preparation for deduplication.

In one example, the deduplication file system may decompress 704 the file. Decompressing the file allows the file system to identify the subfiles. As previously stated, however, it may be possible to identify the subfiles while the file is compressed. Thus, once the file is decompressed (if necessary), the decompressed file is chunked 706 or divided into chunks or parts or pieces. In one example each chunk contains one or more subfiles. For deduplication purposes, each subfile can be treated independently for deduplication and the deduplication operation is performed 708.

Deduplication may involve, for each chunk, determining whether the chunk already exists in the file system. This can be achieved by generating a hash of each chunk and comparing the hash of the chunk with hashes of chunks already stored. A match indicates that the chunk is already present while a mismatch indicates that the chunk should be added to the file system.

An index may be used to map the subfiles of the file to the file. The index thus allows the various subfiles to be retrieved and reconstituted if needed. Each chunk stored in the storage system may map to multiple files.

In one example, differential compression 710 may also be used. In one example, differential compression may be used for files in which the deduplication ratio is low, but where previous versions of the file or files with similar properties. In one example, differential compression allows involves compression using the similarities between two files.

Figure 8:
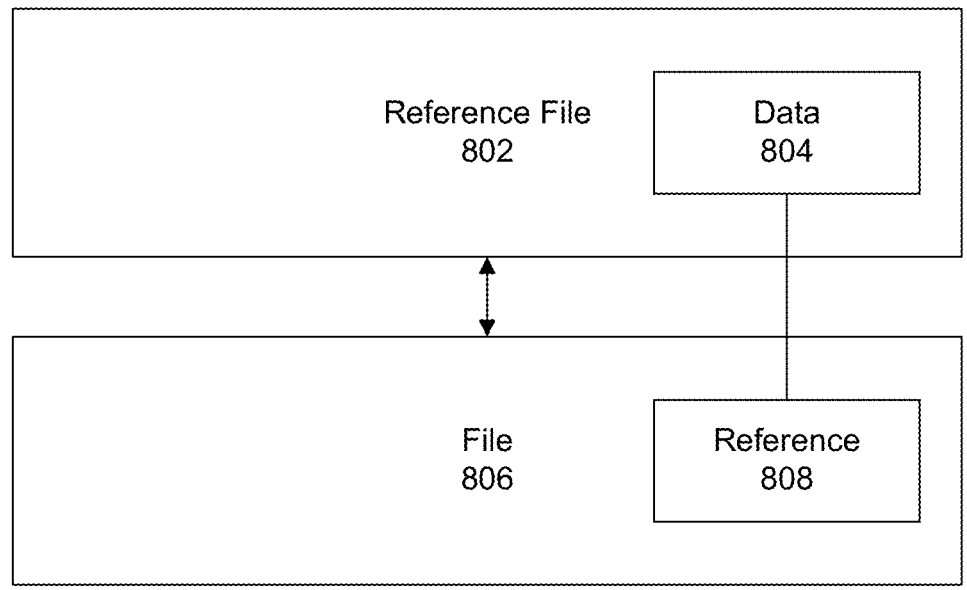
FIG. 8 shows an example of differential compression.

FIG. 8 illustrates an example of differential compression. In one example, the data is maintained in a compressed form, but is separated into portions or chucks. The compression of the file 806 is then performed with reference to the reference file 802. When the file 806 is compressed, a reference 808 may point to data 804 in the reference file. In this example, the reference 808 corresponds to the data 804. If needed when restoring or reconstituting the file 806, the necessary data 804 may be retrieved from the reference file 802. When decompressing the file 806, the reference file 802 is also decompressed.

In other words, differential compression can be used to compress a file using similarities between two files. For example, files with the same name or stored in the same location or the like may be sufficiently similar. For example, a presentation file may be changed by adding a slide. The new document has substantially similarity to the previous version. Using the previous version as a reference file, much of the new version can be replaced with pointers or references. This results in high compression ratios.

In another example, a particular file may not deduplicate well because of small changes. However, the two files can be evaluated differently for compression purposes so that references to a reference file can be used in place of the data. This allows the file to be compressed more effectively. In one example, these files may still be chunked. However, the compression may be able to compare smaller portions of data inside the chunks. This allows higher compression ratios even if the files do not deduplicate due to small changes.

Figure 9:
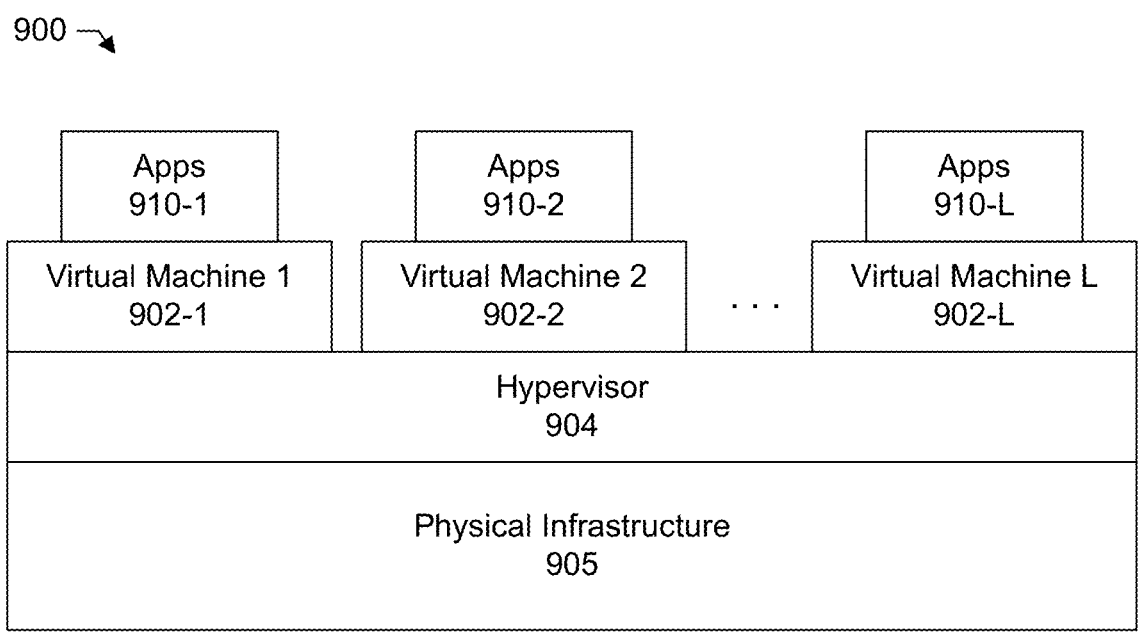
FIG. 9 shows a block diagram of a processing platform that may be utilized to implement at least a portion of an information processing system, according to one or more embodiments.

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

Although only a single hypervisor 904 is shown in the embodiment of FIG. 9, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 904 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

Figure 10:
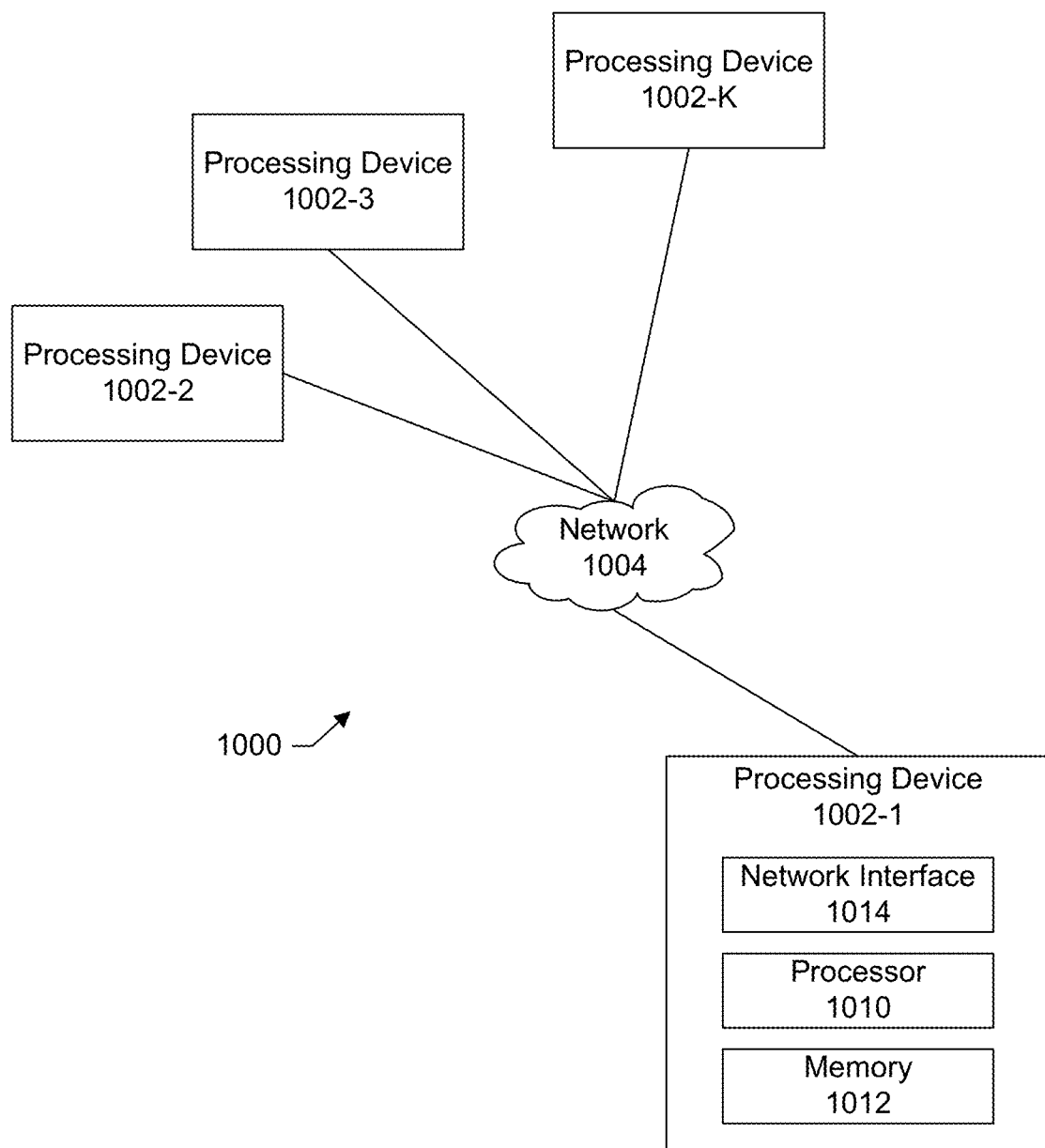
FIG. 10 shows another block diagram of a processing platform that may be utilized to implement at least a portion of an information processing system, according to one or more embodiments.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

Figure 11:
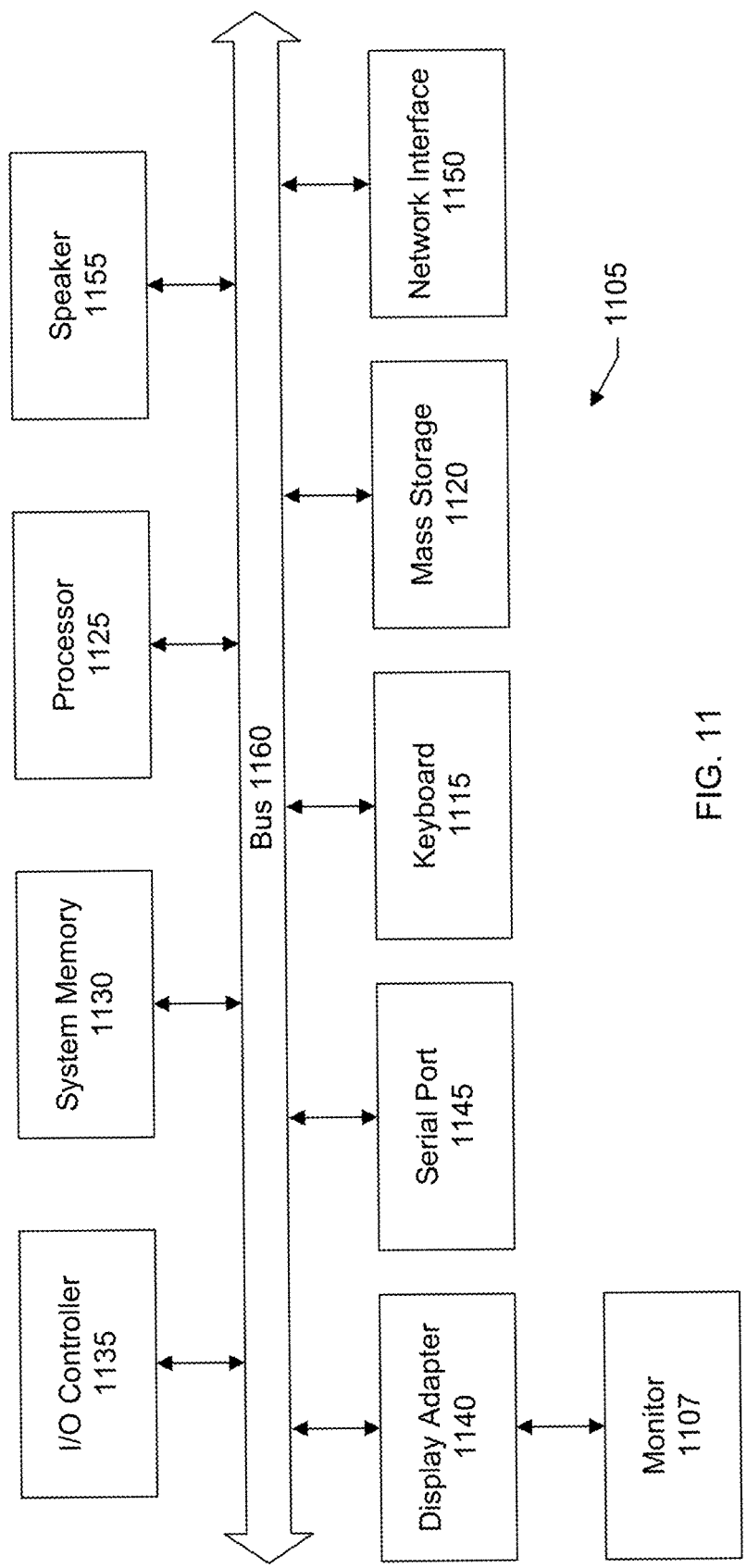
FIG. 11 shows a block diagram of a computer system suitable for use with the information processing system, according to one or more embodiments.

FIG. 11 shows a system block diagram of a computer system 1105 used to execute the software of the present system described herein. The computer system includes a monitor 1107, keyboard 1115, and mass storage devices 1120. Computer system 1105 further includes subsystems such as central processor 1125, system memory 1130, input/output (I/O) controller 1135, display adapter 1140, serial or universal serial bus (USB) port 1145, network interface 1150, and speaker 1155. The system may also be used with computer systems with additional or fewer subsystems. For example, a computer system could include more than one processor 1125 (i.e., a multiprocessor system) or a system may include a cache memory.

Arrows such as 1160 represent the system bus architecture of computer system 1105. However, these arrows are illustrative of any interconnection scheme serving to link the subsystems. For example, speaker 1155 could be connected to the other subsystems through a port or have an internal direct connection to central processor 1125. The processor may include multiple processors or a multicore processor, which may permit parallel processing of information. Computer system 1105 shown in FIG. 11 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows® family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a system includes: a processor; and memory configured to store one or more sequences of instructions which, when executed by the processor, cause the processor to carry out the steps of: receiving, at a deduplication file system, a file from a client for storage in the deduplication file system, the file being in an archive file format that is used by an application on the client, and comprising a plurality of subfiles compressed together in the file according to the archive file format, a plurality of local headers corresponding to the plurality of subfiles, and a central directory used by the application to locate information stored in the file; decompressing the file to store the plurality of subfiles in the deduplication file system separate from the file; creating a metadata file describing a structure of the file, the metadata file comprising the plurality of local headers, the central directory, pointers to the plurality of subfiles in the deduplication file system, but not comprising the plurality of subfiles; presenting the file to the client as a single file having the archive file format; receiving a request from the client to read the file; and reading the metadata file to return data responsive to the request, the returned data comprising metadata from the metadata file, file content from one or more of the plurality of subfiles stored separately in the deduplication file system, or both.

In an embodiment, during the presenting, the file has been decompressed from the archive file format, and the plurality of subfiles have been stored separately from each other on the deduplication file system.

In an embodiment, creating the metadata file comprises: reading the central directory in the file to locate the plurality of local headers in the file, and the plurality of subfiles in the file; writing the central directory, and the plurality of local headers to the metadata file; and not writing the plurality of subfiles to the metadata file. The processor may carry out the step of deduplicating the plurality of subfiles.

In an embodiment, the plurality of subfiles in the file comprise first and second extensible markup language (XML) files, the first XML file comprises content inputted by a user of the application, and the second XML file comprises information generated by the application that describes the content in the first XML file.

In an embodiment, the processor carries out the steps of: upon receiving the request to read the file, reading the central directory in the metadata file to determine a location of first data responsive to the request; determining that the location of the first data is in a first subfile, the first subfile being stored separate from the metadata file on the deduplication file system, and the first subfile having been present in the file received from the client; and reading the first subfile to return the first data to the client.

In another specific embodiment, a method includes: receiving, at a deduplication file system, a file from a client for storage in the deduplication file system, the file being in an archive file format that is used by an application on the client, and comprising a plurality of subfiles compressed together in the file according to the archive file format, a plurality of local headers corresponding to the plurality of subfiles, and a central directory used by the application to locate information stored in the file; decompressing the file to store the plurality of subfiles in the deduplication file system separate from the file; creating a metadata file describing a structure of the file, the metadata file comprising the plurality of local headers, the central directory, pointers to the plurality of subfiles in the deduplication file system, but not comprising the plurality of subfiles; presenting the file to the client as a single file having the archive file format; receiving a request from the client to read the file; and reading the metadata file to return data responsive to the request, the returned data comprising metadata from the metadata file, file content from one or more of the plurality of subfiles stored separately in the deduplication file system, or both.

In another specific embodiment, there is a computer program product, comprising a non-transitory computer-readable medium having a computer-readable program code embodied therein, the computer-readable program code adapted to be executed by one or more processors to implement a method comprising: receiving, at a deduplication file system, a file from a client for storage in the deduplication file system, the file being in an archive file format that is used by an application on the client, and comprising a plurality of subfiles compressed together in the file according to the archive file format, a plurality of local headers corresponding to the plurality of subfiles, and a central directory used by the application to locate information stored in the file; decompressing the file to store the plurality of subfiles in the deduplication file system separate from the file; creating a metadata file describing a structure of the file, the metadata file comprising the plurality of local headers, the central directory, pointers to the plurality of subfiles in the deduplication file system, but not comprising the plurality of subfiles; presenting the file to the client as a single file having the archive file format; receiving a request from the client to read the file; and reading the metadata file to return data responsive to the request, the returned data comprising metadata from the metadata file, file content from one or more of the plurality of subfiles stored separately in the deduplication file system, or both.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A system comprising: a processor; and memory configured to store one or more sequences of instructions which, when executed by the processor, cause the processor to carry out the steps of:

receiving, at a deduplication file system, a file from a client for storage in the deduplication file system, the file being in an archive file format that is used by an application on the client, and comprising a plurality of subfiles compressed together in the file according to the archive file format, a plurality of local headers corresponding to the plurality of subfiles, and a central directory used by the application to locate information stored in the file;

decompressing the file to store the plurality of subfiles in the deduplication file system separate from the file;

creating a metadata file describing a structure of the file, the metadata file comprising the plurality of local headers, the central directory, pointers to the plurality of subfiles in the deduplication file system, but not comprising the plurality of subfiles;

presenting the file to the client as a single file having the archive file format;

receiving a request from the client to read the file; and reading the metadata file to return data responsive to the request, the returned data comprising metadata from the metadata file, file content from one or more of the plurality of subfiles stored separately in the deduplication file system, or both, wherein the plurality of subfiles in the file comprise first and second extensible markup language (XML) files, the first XML, file comprises content inputted by a user of the application, and the second XML, file comprises information generated by the application that describes the content in the first XML file.

2. The system of claim 1 wherein during the presenting, the file has been decompressed from the archive file format, and the plurality of subfiles have been stored separately from each other on the deduplication file system.

3. The system of claim 1 wherein creating the metadata file comprises:
reading the central directory in the file to locate the plurality of local headers in the file, and the plurality of subfiles in the file;
writing the central directory, and the plurality of local headers to the metadata file; and
not writing the plurality of subfiles to the metadata file.

4. The system of claim 1 wherein the processor carries out the step of deduplicating the plurality of subfiles.

5. The system of claim 1 wherein the processor carries out the steps of:
upon receiving the request to read the file, reading the central directory in the metadata file to determine a location of first data responsive to the request;
determining that the location of the first data is in a first subfile, the first subfile being stored separate from the metadata file on the deduplication file system, and the first subfile having been present in the file received from the client; and
reading the first subfile to return the first data to the client.

6. A method comprising:
receiving, at a deduplication file system, a file from a client for storage in the deduplication file system, the file being in an archive file format that is used by an application on the client, and comprising a plurality of subfiles compressed together in the file according to the archive file format, a plurality of local headers corresponding to the plurality of subfiles, and a central directory used by the application to locate information stored in the file;
decompressing the file to store the plurality of subfiles in the deduplication file system separate from the file;
creating a metadata file describing a structure of the file, the metadata file comprising the plurality of local headers, the central directory, pointers to the plurality of subfiles in the deduplication file system, but not comprising the plurality of subfiles;
presenting the file to the client as a single file having the archive file format;
receiving a request from the client to read the file; and
reading the metadata file to return data responsive to the request, the returned data comprising metadata from the metadata file, file content from one or more of the plurality of subfiles stored separately in the deduplication file system, or both, wherein the plurality of subfiles in the file comprise first and second extensible markup language (XML) files, the first XML, file comprises content inputted by a user of the application, and the second XML, file comprises information generated by the application that describes the content in the first XML file.

7. The method of claim 6 wherein during the presenting, the file has been decompressed from the archive file format, and the plurality of subfiles have been stored separately from each other on the deduplication file system.

8. The method of claim 6 wherein creating the metadata file comprises:
reading the central directory in the file to locate the plurality of local headers in the file, and the plurality of subfiles in the file;
writing the central directory, and the plurality of local headers to the metadata file; and
not writing the plurality of subfiles to the metadata file.

9. The method of claim 6 comprising deduplicating the plurality of subfiles.

10. The method of claim 6 comprising:
upon receiving the request to read the file, reading the central directory in the metadata file to determine a location of first data responsive to the request;
determining that the location of the first data is in a first subfile, the first subfile being stored separate from the metadata file on the deduplication file system, and the first subfile having been present in the file received from the client; and
reading the first subfile to return the first data to the client.

11. A computer program product, comprising a non-transitory computer-readable medium having a computer-readable program code embodied therein, the computer-readable program code adapted to be executed by one or more processors to implement a method comprising:
receiving, at a deduplication file system, a file from a client for storage in the deduplication file system, the file being in an archive file format that is used by an application on the client, and comprising a plurality of subfiles compressed together in the file according to the archive file format, a plurality of local headers corresponding to the plurality of subfiles, and a central directory used by the application to locate information stored in the file;
decompressing the file to store the plurality of subfiles in the deduplication file system separate from the file;
creating a metadata file describing a structure of the file, the metadata file comprising the plurality of local headers, the central directory, pointers to the plurality of subfiles in the deduplication file system, but not comprising the plurality of subfiles;
presenting the file to the client as a single file having the archive file format;
receiving a request from the client to read the file; and
reading the metadata file to return data responsive to the request, the returned data comprising metadata from the metadata file, file content from one or more of the plurality of subfiles stored separately in the deduplication file system, or both, wherein the plurality of subfiles in the file comprise first and second extensible markup language (XML) files, the first XML, file comprises content inputted by a user of the application, and the second XML, file comprises information generated by the application that describes the content in the first XML file.

12. The computer program product of claim 11 wherein during the presenting, the file has been decompressed from the archive file format, and the plurality of subfiles have been stored separately from each other on the deduplication file system.

13. The computer program product of claim 11 wherein creating the metadata file comprises:
reading the central directory in the file to locate the plurality of local headers in the file, and the plurality of subfiles in the file;
writing the central directory, and the plurality of local headers to the metadata file; and
not writing the plurality of subfiles to the metadata file.

14. The computer program product of claim 11 wherein the method comprises deduplicating the plurality of subfiles.

15. The computer program product of claim 11 wherein the method comprises:
- upon receiving the request to read the file, reading the central directory in the metadata file to determine a location of first data responsive to the request;
- determining that the location of the first data is in a first subfile, the first subfile being stored separate from the metadata file on the deduplication file system, and the first subfile having been present in the file received from the client; and
- reading the first subfile to return the first data to the client.

* * * * *